United States Patent
Zhang et al.

(10) Patent No.: US 10,658,663 B2
(45) Date of Patent: May 19, 2020

(54) ELECTRODE DESIGNS FOR LITHIUM ION BATTERY AND CAPACITOR HYBRID SYSTEM

(71) Applicant: GM GLOBAL TECHNOLOGY OPERATIONS LLC, Detroit, MI (US)

(72) Inventors: Xiusheng Zhang, Shanghai (CN); Jingjing Wu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 233 days.

(21) Appl. No.: 15/695,050

(22) Filed: Sep. 5, 2017

(65) Prior Publication Data

US 2019/0074510 A1    Mar. 7, 2019

(51) Int. Cl.
*H01M 4/505* (2010.01)
*H01M 4/66* (2006.01)
*H01M 4/40* (2006.01)
*H01M 10/0525* (2010.01)
*H01M 10/0587* (2010.01)
(Continued)

(52) U.S. Cl.
CPC ............ *H01M 4/505* (2013.01); *H01G 11/00* (2013.01); *H01M 2/16* (2013.01); *H01M 4/13* (2013.01); *H01M 4/405* (2013.01); *H01M 4/485* (2013.01); *H01M 4/587* (2013.01); *H01M 4/663* (2013.01); *H01M 10/0525* (2013.01); *H01M 10/0587* (2013.01); *H01M 2004/028* (2013.01); *H01M 2220/20* (2013.01)

(58) Field of Classification Search
CPC ...... H01M 4/505; H01M 4/405; H01M 4/663; H01M 2/16; H01M 10/0587; H01M 10/0525; H01M 2004/028; H01M 2220/20
See application file for complete search history.

(56) References Cited

U.S. PATENT DOCUMENTS

| | | | |
|---|---|---|---|
| 2010/0203362 A1* | 8/2010 | Lam | H01M 4/56 429/7 |
| 2012/0100437 A1* | 4/2012 | Nakahara | H01G 11/02 429/338 |

(Continued)

OTHER PUBLICATIONS

Liu et al., U.S. Appl. No. 15/221,963 entitled "Hybrid Cell Design of Alternately Stacked or Wound Lithium Ion Battery and Capacitor Electrodes," filed Jul. 28, 2016.

*Primary Examiner* — Lisa S Park
(74) *Attorney, Agent, or Firm* — Reising Ethington P.C.

(57) ABSTRACT

Lithium-utilizing electrochemical cells, providing hybrid battery and capacitor activity, are formed of one or more lithium battery anodes, optionally also including a capacitor electrode, and one or more lithium battery cathodes, optionally with a capacitor electrode, provided that there is at least one capacitor electrode in the hybrid cell and that there are an equal number of electrodes of opposing charge. The respective electrodes are formed of porous layers of one of lithium anode material particles, lithium cathode material particles, or compatible capacitor material particles, formed on one or both sides of a compatible current collector foil. The amounts of active battery and capacitor particles are managed by the thickness of the porous coating layers, and one-side or two-side electrode coatings, to balance the capacities of the battery and capacitor particles to accept and release lithium ions during repeated charging and discharging of the hybrid cell.

20 Claims, 4 Drawing Sheets

(51) Int. Cl.
*H01M 2/16* (2006.01)
*H01M 4/485* (2010.01)
*H01M 4/587* (2010.01)
*H01M 4/13* (2010.01)
*H01G 11/00* (2013.01)
*H01M 4/02* (2006.01)

(56) References Cited

U.S. PATENT DOCUMENTS

2012/0114982 A1\* 5/2012 Mitsuda ................ H01G 9/058
429/9
2014/0113184 A1\* 4/2014 Hamel ................ H01M 2/0207
429/179

\* cited by examiner

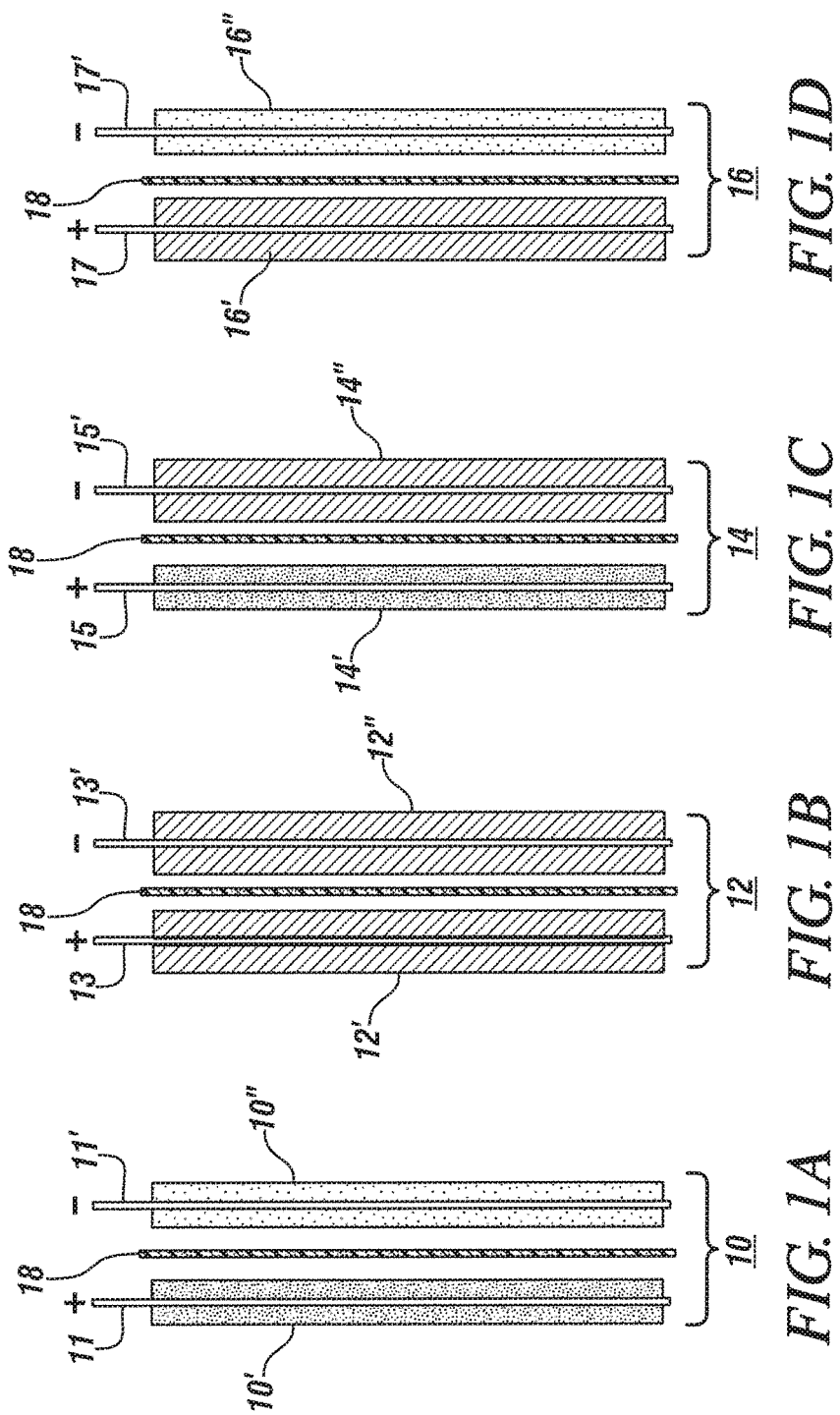

US 10,658,663 B2

ELECTRODE DESIGNS FOR LITHIUM ION BATTERY AND CAPACITOR HYBRID SYSTEM

TECHNICAL FIELD

Lithium-ion battery anodes and cathodes, formed of a porous layer of anode or cathode material particles on one or both sides of a current collector foil, are used in combination with one side or two side-coated lithium ion-adsorbing capacitor electrodes to form hybrid electrochemical cells. Combinations of the porous battery electrodes and capacitor electrodes are prepared and arranged with inter-placed porous separators and infiltrated with a non-aqueous lithium ion-conducting electrolyte solution to provide a predetermined combination of battery and capacitor capacities in each such individual hybrid cell. The capacities of battery anode materials and capacitor cathode materials in the cells are proportionally balanced to best utilize the flow of lithium ions in each cell. The capacity, coulombic efficiency, and life of the hybrid cells are thereby increased.

CROSS-REFERENCE TO RELATED APPLICATION

The content of the subject patent application provides improvements to the operation of the hybrid cell designs disclosed in co-pending application Ser. No. 15/221,963, filed Jul. 28, 2016, and titled Hybrid Cell Design of Alternately Stacked or Wound Lithium Ion Battery and Capacitor Electrodes. This co-pending application is assigned to the same assignee as subject application. Portions of the text of the earlier co-pending application are included in the subject specification.

BACKGROUND OF THE INVENTION

The material presented as background information in this section of the specification is not necessarily prior art.

Electric-powered automotive vehicles use multi-cell batteries to provide electrical energy for providing electrical power for driving the vehicle and for providing electrical energy to many devices on the vehicle. Batteries comprising many lithium-ion electrochemical cells are examples of such electrical power sources. And such batteries are used in many non-automotive applications.

In some applications, it may be useful to combine a lithium-ion battery with a capacitor. For example, such capacitors may be charged during braking of the vehicle and the stored electrical charge used in recharging cells of the lithium-ion battery.

There is a need for a practice to jointly package and employ cells for lithium-ion batteries and such capacitors for efficiency in their mutual interconnection and interaction.

SUMMARY OF THE INVENTION

In accordance with practices of this invention, anode and cathode materials for lithium-ion batteries are used in varying combinations with compatible capacitor materials to form electrodes for hybrid electrochemical cells to conveniently provide different predetermined combinations of lithium-ion battery properties and capacitor properties. Such combinations of lithium ion battery electrodes and capacitor electrodes can be readily adapted and arranged to produce different, useful combinations of energy densities (Wh/kg) and power densities (W/kg) in a hybrid electrochemical cell that better adapts its use in different applications. In the following text, the anode is often referred to as the negative electrode (as it is during cell discharge) and the cathode is often referred to as the positive electrode (as it is during cell discharge). One or more capacitor electrodes are grouped with the battery anode electrodes and/or the battery cathode electrodes. The capacitor material electrode(s) will have the same charge as the battery electrode with which it is electrically connected in the hybrid cell. In each hybrid cell of this invention there will be at least two electrically-connected negative electrodes and two electrically-connected positive electrodes. And there will be an equal number of negative and positive electrodes in the hybrid cell. For example, a hybrid electrochemical cell may consist of two negative electrodes of lithium intercalating anode material and one positive electrode of lithium-intercalating cathode material and one negative electrode of capacitor material.

In accordance with a further aspect of this invention, detailed attention is given to balance the flow of lithium ions through the electrolyte of the hybrid cell between battery electrodes and capacitor electrodes of opposing electrical charge. This is accomplished by adjusting the amounts and locations of the respective electrode materials so as to proportion the lithium-ion adsorbing or utilizing capacity of the electrode materials which are releasing and adsorbing lithium ions during each charge and discharge cycle of the hybrid cell.

In general, each electrode is formed of a suitable current collector foil that is coated on one or both sides with a porous layer of micrometer-size particles of active lithium ion battery anode particles, or of lithium ion battery cathode particles, or with a porous layer of like-wise sized capacitor particles.

Each such one-side or two-side coated electrode is typically less than a millimeter in thickness. And each electrode is shaped in its other two dimensions so that alternating positively charged and negatively charged electrodes may be assembled with interposed, thin, porous separator layers in the formation of a hybrid battery/capacitor electrochemical cell. Such a hybrid cell may be formed of a stack of equal numbers of like-shaped (typically rectangular shaped) alternating positive and negative electrodes and separators. In a different cell assembly method, the cell may be formed by winding like-shaped (typically long rectangular strips) alternating two-sided positive and negative electrodes and separators layers into rolled assemblies. In an assembled, formed cell, the micro-pores of the alternating electrodes and separators are filled with a lithium cation-conducting electrolyte composed of one or more lithium salts (such as $LiPF_6$) dissolved in a non-aqueous liquid electrolyte that functions at the required operating temperature range of the hybrid cell.

By way of illustrative examples, suitable anode materials include graphite particles or lithium titanate particles ($Li_4Ti_5O_{12}$, LTO); a suitable cathode material is particles of $LiMn_2O_4$ (LMO), $LiNi_xMn_yCo_{(1-x-y)}O_2$ (NMC) or particles of $LiFePO_4$ (LFP); and a suitable capacitor material is particles of activated carbon. In the operation of a cell the anode particles and cathode particles interact with the electrolyte to alternately intercalate and de-intercalate lithium ions (Li+), positively charged capacitor electrode particles alternately adsorb and desorb anions (such as $PF_6^-$), and negatively charged capacitor electrode particles alternately adsorb and desorb cations (such as $Li^+$). The hybrid system has two types of capacitor arrangements. One is where the capacitor electrode is connected with a battery electrode (LIC). For example, if an anode electrode (LTO particles) is connected with a capacitor (AC particles), the anode will alternately intercalate and de-intercalate lithium ions and the capacitor will de-absorb and absorb corresponding anions (e.g., $PF_6^-$) during charge/discharge. Another capacitor assembly is an electrochemical double layer capacitor (EDLC) in which both electrodes are capacitors (which are further paired with a battery electrode or electrodes in a hybrid cell). In an EDLC, the cathode capacitor absorbs/desorbs $PF_6^-$ and the anode capacitor adsorbs/desorbs $Li^+$ during the repeated charge/discharge cycling.

In general, the process of intercalation/de-intercalation occurs throughout the whole volume of the selected particulate battery electrode material. A gram of battery electrode material can usually intercalate a greater amount of lithium ions than are adsorbed on the surfaces of a like amount of capacitor particles. But the release of lithium ions from battery electrode particles is typically slower than the release of lithium ions from selected capacitor particles. The battery particles are typically capable of producing a greater energy density (Wh/kg) per gram than capacitor particles, but the capacitor particles release adsorbed lithium ions faster and are typically capable of providing a greater power density (W/kg) than battery particles.

The amounts of the respective electrode materials are determined by the cell design with its intended energy density and power density. The selected compositions of the anode, cathode, and capacitor materials have known molar or weight capacities to interact with the lithium anions and the cations of the selected electrolyte. And the observed capacities of the particles of the electrode materials, in their bonded layers on a current collector foil may be confirmed experimentally. The capacity of battery electrode material may be determined by its molar content (mAh/g) and actual weight loading. The capacity and amount of capacitor material may also be determined by its molar content or weight. Sometimes an N/P ratio is used in this specification. The N/P ratio refers to the negative electrode capacity (anode during cell discharge) to positive electrode capacity (cathode capacity).

Sometimes it is convenient to devise or prepare a hybrid cell starting with an existing design of a lithium-ion battery cell. The respective amounts of anode and cathode electrode materials are known and their function demonstrated. And often the electrode members of the existing battery cell have been organized and prepared to have substantially equal thicknesses for the assembly of the cell packages making up the battery. The required strategy in making a new hybrid cell, or to convert an existing battery cell to a hybrid cell, is to determine the locations and amount(s) of capacitor materials to be used in preparing the electrode members for a desired hybrid cell of desired energy and power densities. It is recognized herein that the molar (or weight) capacity of battery electrode materials to react with the electrolyte to intercalate and de-intercalate lithium ions and corresponding anions significantly exceeds the molar or weight capacities of useful capacitor material particles to absorb and de-absorb the same ions in the same electrochemical cell environment. We have found that it is necessary to balance the ion-utilizing capacities of the respective electrodes in order to best utilize the potential advantages and properties of a hybrid lithium-ion battery/capacitor cell. In order to suitably balance the respective capacities (for example, to balance the N/P ratio) of the electrodes of the hybrid cell, several structural changes are disclosed and illustrated in this specification. Mismatches in the relative amounts and thicknesses of battery electrode materials and capacitor electrode materials must be accommodated in the design and assembly of the electrodes of a hybrid lithium-ion battery/capacitor cell.

In accordance with practices of this invention, specific attention is given to the relative capacities of a particulate battery anode material or a particulate cathode material and an adjoining capacitor electrode material of opposite electrical charge. Each anode and cathode needs to receive and properly utilize all of the incoming lithium ions, as interacting electrode members in a common hybrid cell formed of lithium battery electrodes (sometime referred to herein as LIB) and capacitor electrodes (LIC or EDLC). It is necessary that each material-coated side of each battery electrode receives the quantity of lithium ions that it can assimilate and utilize. Otherwise, the operation of the hybrid cell is compromised.

But first we proceed with a description of the electrode members of the hybrid cells.

In a first embodiment of this invention, four different cell units serve as basic elements for combining into a hybrid cell design of lithium ion battery electrodes and capacitor electrodes. Each individual cell unit is formed of at least two electrodes, each with a porous layer of the same particulate electrode material coated on one or both sides of a compatible current collector foil. The two electrodes are aligned side-by-side with facing electrode layers separated by a porous separator member. And the respective units are like-shaped or shaped complimentarily so that they can be assembled in a predetermined relationship in a stack, or wound in a roll, to form a hybrid lithium-ion battery and capacitor electrochemical cell.

A first cell unit (Unit A) is formed of a two-side coated cathode and a two-side coated anode for a lithium-ion battery. The anode is negatively charged and the cathode positively charged when the cell is being discharged. A second cell unit (Unit B) is formed of a two-sided capacitor positive electrode and a two-sided capacitor negative electrode with an interposed separator. A third cell unit (Unit C) is formed of a two-sided cathode electrode (+) and a two-sided capacitor electrode (−) with an interposed porous separator. And a fourth cell unit (Unit D) is formed of a two-sided anode electrode (−) and a two-sided capacitor electrode (+) with an interposed separator. For purposes of illustration: particles of graphite or LTO may be used as a battery anode material; particles of NMO or NMC may be used as a battery cathode material; and particles of activated carbon may be used in each capacitor electrode.

Combinations of two or more of these cell unit types are combined to form a hybrid cell design combining at least one battery electrode and one capacitor electrode. For example, a combination of cell Units A and C (with an interposed separator) provides a combination of a lithium ion battery cell (LIB) and a lithium capacitor cell (LIC) using a battery cathode material and a capacitor electrode. In their charged state, the two anode electrodes are negatively charged and the cathode electrode and capacitor electrode are positively charged. Depending on the compositions and relative amounts of the respective electrode materials, this hybrid combination of cell Units A and C can provide a useful combination of battery energy density and capacitor power density.

As a second illustrative example, a combination of three cell units A, C, and C in a hybrid electrochemical cell provides a combination of a lithium-ion battery cell with two cells using a battery cathode material and capacitor counter-electrodes. In its charged state, the overall combination of units provides a cell with three positively charged battery cathode electrodes, a negatively charged battery anode electrode and two negatively charged capacitor electrodes. This hybrid cell combination, with two negatively charged capacitor electrodes, can provide a different useful combination of battery energy density and capacitor power density.

In a third illustrative example, a combination of four cell units, C, D, D, and B, in a hybrid electrochemical cell provides a combination of a cathode (+)/capacitor (−) cell, two anode (−)/capacitor (+) cells, and a capacitor (+)/capacitor (−) cell in its charged state. And this cell combination, with one battery cathode, two battery anodes, two negatively charged capacitor electrodes, and three positively charged capacitor electrodes, can provide still a different useful combination of battery energy density and capacitor power density.

The energy density and power density of a specific combination of the above described cell units (A), (B), (C), and (D) will depend on the specific electrode materials selected and the loadings of the materials in the electrodes. In general, an increase in the amount of the two-side coated capacitor positive electrode material and two-side coated capacitor negative electrode material (cell unit B) will increase the power density of a hybrid cell. An increase in the amount of cell unit A will increase the energy density of a hybrid cell. And combinations of cell units, C and D, can be used to balance the energy and power performance of a cell.

Such hybrid combinations of cell units may be formed by the stacking of individual (typically rectangular shaped) cell units with interposed separators, or by the rolling of an arranged assembly of like-shaped, elongated, cell units with interposed separators.

But it is found that the capacities of the electrode members and the capacitor members to accept and use lithium ions in the combined cell units is preferably balanced in order to take advantage of the benefits of the unique structures of the cell members. For example, when a hybrid cell is formed of a stacked assembly of two or more LTO battery anode members and a corresponding number of LMO battery cathode member(s) and activated carbon (AC) capacitor electrode(s), provision is to be made to manage the flow of lithium ions between the electrodes during charging and discharging of the hybrid cell. The balance of such lithium ion exchange capacities is of particular concern in locations where a battery electrode is facing a capacitor electrode of opposing charge. In the hybrid cell, the stacked electrodes, each consisting of two porous electrode layers bonded to opposite surfaces of a current collector foil, are physically spaced with a thin porous polymeric separator (e.g., about ten micrometers thick) and the pores of each of the electrode layers and the separators are fully infiltrated with an electrolyte (for example a solution of $LiPF_6$ in a mixture of organic solvents).

During charging of the cell members, lithium ions are de-intercalated from the LMO cathode and de-absorbed from the AC capacitor, flow through the electrolyte, and intercalated into the LTO anode material as $PF_6^-$ anions flow through the electrolyte in the opposite direction between the electrodes. It is found that there is a need to balance the respective capacities of the active materials of the LTO anodes and of the AC and LMO cathodes to receive and chemically accept lithium ions. It is desired to minimize excessive diffusion of lithium ions on or into any of the electrode materials. As will be shown further in this specification, the capacities to receive and manage lithium ions by the respective capacitor electrodes and battery electrodes are preferably carefully balanced in order to maintain the operating efficiencies and lives of the hybrid cells. For example, in an assembly of at least one pair of facing, opposing electrical charge electrodes including at least one electrode coating layer of capacitor material facing at least one layer of opposing lithium-ion battery anode material or at least one layer of opposing cathode material, the measured lithium ion accepting capacity of the capacitor material and the measured lithium ion accepting capacity of the anode or cathode material is in the ratio range of 0.8-1.2. In other words, the weight or molar amount of the battery electrode material and the capacitor material, infiltrated with the same liquid electrolyte and spaced a few micrometers from each other by a porous separator, are determined such that the lithium ions flowing between the particulate electrode materials are suitably and fully utilized.

Other objects and advantages of the invention will be apparent from specific illustrations of practices of the invention which follow below in this specification.

BRIEF DESCRIPTION OF THE DRAWINGS

FIGS. 1A-1D are schematic side views of four cell units of two opposing electrodes for use in forming hybrid electrochemical cells in accordance with one embodiment of this invention. The end surfaces of each electrode and its separator are distinguished with slanted lines or with dots so as to better distinguish the different elements of each electrode. Each illustrated cell unit is formed of an upstanding current collector foil with a connector tab extending upwardly from the top side of the foil. A porous layer of a particulate electrode material is bonded to each major face of the current collector foil. The positive (+) and negative (−) signs above the current collector tabs indicates the electrical charge of the charged electrode in the cell unit (as it is being discharged). A porous separator layer separates facing sides of the electrodes. FIG. 1A illustrates the first cell unit (10) is formed of positively-charged cathode material for a lithium-ion battery cell and negatively charged anode material. FIG. 1B illustrates the second cell unit (12) which is formed of positively charged capacitor material (+) and negatively charged capacitor material (−). FIG. 1C illustrates the third cell unit (14) which is formed of Li-battery cathode material (+) and capacitor material (−). FIG. 1D illustrates a fourth unit cell formed of positively charged capacitor material (+) and negatively charged anode material (−).

In FIG. 2B, the second hybrid electrochemical cell grouping is formed of individual cell units 14, 14, and 10 as illustrated in FIGS. 1C and 1A. And in FIG. 2C, the third hybrid electrochemical cell grouping is formed of individual cell units 14, 16, 16, and 12 as illustrated in FIGS. 1C, 1D, and 1B. In an assembled hybrid cell, the porous electrode members would be closely stacked against the interposed porous separators, and the porous members infiltrated with a non-aqueous solution of a lithium electrolyte.

In FIG. 3A, two lithium titanate (LTO) anodes are paired with a lithium manganese oxide (LMO) battery cathode and an activated carbon (AC) capacitor cathode. The LTO anode members are electrically connected and indicated as negatively charged, as they would be when the hybrid cell is being discharged. The LMO battery cathode and AC capacitor cathode are electrically connected and indicated as positively charged. As will be explained below in this specification, the amount of activated carbon in the capacitor cathode has been increased for the purpose of equalizing the flow of lithium ions during the charging of the hybrid cell. For purposes of simplifying the illustration of the hybrid cell, the separators which would be placed between the electrodes in a closely stacked assembly are not shown, and the liquid electrolyte that would be infused into the pores of the electrode materials and the separators is not illustrated.

In FIG. 3B, two lithium titanate (LTO) anodes and an activated carbon capacitor anode are assembled with two LMO cathodes and an activated carbon capacitor cathode. The anode members are electrically connected and indicated as negatively charged. The cathode members are electrically connected and indicated as positively charged. The amount of activated carbon in each of the capacitor anode and the capacitor cathode has been increased for the purpose of equalizing the flow of lithium ions during the charging of the hybrid cell. Again, in a fully assembled hybrid cell, separators would be placed between the electrodes in a closely stacked assembly and an liquid electrolyte would be infused into the pores of the electrode materials and the separators.

In FIG. 4A, two lithium titanate (LTO) anodes are paired with a lithium manganese oxide (LMO) battery cathode and an activated carbon (AC) capacitor cathode. The LTO anode members are electrically connected and indicated as negatively charged as they would be when the hybrid cell is being discharged. The LMO battery cathode and AC capacitor cathode are electrically connected and indicated as positively charged. As will be explained below in this specification, the amount of active LTO particles on one side of each of the LTO anodes has been reduced, and amount of activated carbon in each side of the capacitor cathode has been increased. Each modification is for the purpose of equalizing the flow of lithium ions during the charging of the hybrid cell.

In FIG. 4B, two lithium titanate (LTO) anodes and an activated carbon capacitor anode are assembled with two LMO cathodes and an activated carbon capacitor cathode. The anode members are electrically connected and indicated as negatively charged. The cathode members are electrically connected and indicated as positively charged. As will be explained below in this specification, the amount of active LTO material in the one side of the each of the anode electrodes (the sides facing the AC capacitors) has been decreased for the purpose of equalizing the flow of lithium ions during the charging of the hybrid cell.

In FIG. 5A, three anode members utilizing porous layers of LTO particles are inter-positioned in a specific arrangement with two LMO cathode members and an AC cathode member. In this embodiment, the AC cathode member has particles of activated carbon on only one side of its current collector. The two LTO cathode members positioned on opposite sides of the AC capacitor have LTO particles on only one side of their current collector foils. And the LMO cathode positioned between two LTO anodes has a porous layer of LMO particles on only one side of its current collector foil. This modification to the electrode structures is made for the purpose of reducing the flow of lithium ions between one of the LTO electrodes and an adjacent capacitor during the charging of the hybrid cell.

In FIG. 5B, two LTO anode members and an AC capacitor member (negatively charged) are inter-positioned in a specific pattern with two LMO cathode members and an inter-positioned AC capacitor member (positively charged). In this embodiment, one LTO anode has particles of LTO on only one side of its current collector foil, and one LMO cathode has particles of LMO on only one side of its current collector foil. Both AC electrodes have a porous layer of particles on only one side of their current collector foils. Again, this change in the electrode structures has been made for the purpose of reducing the flow of lithium ions between two capacitor electrodes and one LTO electrode and the LMO electrode during the charging of the hybrid cell.

DESCRIPTION OF PREFERRED EMBODIMENTS

Figure 2A:
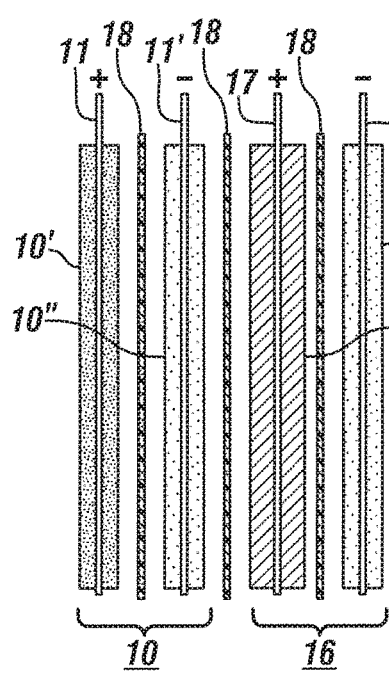
FIGS. 2A through 2C are schematic side views of three groups of stacked hybrid assemblies of two or more of the individual cell units illustrated in FIGS. 1A-1D. Viewed from left to right in FIG. 2A, the first hybrid grouping is formed of individual cell units 10 and 16 (as illustrated in FIGS. 1A and 1D).

The electrodes of lithium-ion cells are often formed by bonding particles of active electrode materials that have a largest dimension in the range of about 0.5 to 30 micrometers to a compatible metal current collector foil having a thickness of about 5 to 30 micrometers. The particles are bonded in a porous layer of generally uniform thickness on a major surface of the current collector foil so that the layer can subsequently be infiltrated with an electrolyte solution. As stated, the shape of the current collector is often rectangular with side dimensions that provide a predetermined surface area to enable it to support a predetermined quantity of electrode material for a lithium-ion battery electrode or capacitor electrode member. Each side of the current collector foil may be coated with a porous layer of particles of electrode material, but the sustainable thickness of each layer is usually limited to about 5 μm to 250 μm. In accordance with practices of this invention, the thicknesses of the layers of active electrode materials and of the capacitor materials are carefully determined, for the purpose of enhancing the function of the hybrid battery and capacitor cells in which the materials are employed. In some embodiments, one side of the current collector may be left uncoated for the same purpose.

In a first embodiment of this invention, four different electrochemical cell units of opposing positively-charged and negatively-charged porous electrodes of varying compositions of particulate electrode materials are described. In order to simplify this general discussion of the respective electrodes, the thickness of the porous coating layers of battery or capacitor particles may be visualized without regard to a specified thickness. Combinations of two or more pairs of these electrodes (cell units) are assembled for use in forming hybrid lithium-ion battery/capacitor cells in accordance with one embodiment of this invention. In a hybrid battery/capacitor electrochemical cell, a predetermined combination of the pairs of opposing electrodes will be assembled, with interposed porous separators and the pores of the assembled electrodes and separators infiltrated with a liquid solution of a suitable lithium-containing electrolyte.

As stated, in practices of this invention, electrodes are formed of various combinations particles of capacitor materials and lithium-ion battery materials. Activated carbon particles are preferred for use as capacitor materials, whether the electrode in which they are used is positively or negatively charged.

A few examples of suitable electrode materials for an anode electrode (negative electrode during discharge of the cell) of a lithium ion cell are graphite, some other forms of carbon, silicon, alloys of silicon with lithium or tin, silicon oxides ($SiO_x$), metal oxides, and lithium titanate. During cell-discharge, electrons are released from the anode material into the electrical power-requiring external circuit and lithium ions are released (de-intercalated) into an anhydrous lithium ion conducting electrolyte solution. Typically, lithium-ion cell anode materials are resin-bonded as a porous layer onto one or both sides of a copper current collector foil. Lithium titanate particles may be resin bonded to either a copper current collector foil or to an aluminum current collector foil. A small amount of conductivity enhancing carbon particles may be mixed with the anode particles.

Examples of positive electrode materials (cathode), used in particulate form, include lithium manganese oxide, lithium nickel oxide, lithium cobalt oxide, lithium nickel manganese cobalt oxide, other lithium-metal-oxides, and lithium iron phosphate. Other materials are known and commercially available. One or more of these materials may be used in an electrode layer. Typically, lithium-ion cell cathode materials are resin-bonded to one or both sides of an aluminum current collector foil. A small amount of conductivity enhancing carbon particles may be mixed with the cathode particles.

In addition to activated carbon particles, suitable capacitor cathode and anode materials include, in particulate form, for example:

Metal Oxides, MOx, where M=Pb, Ge, Co, Ni, Cu, Fe, Mn, Ru, Rh, Pd, Cr, Mo, W, Nb.

Metal Sulfides, such as $TiS_2$, NiS, $Ag_4Hf_3S_8$, CuS, FeS, $FeS_2$.

Other various forms of carbon particles, such as activated carbon fibers, graphite, carbon aerogel, carbide-derived carbon, graphene, graphene oxide, and carbon nanotubes. More than one type of carbon may be used in a blended capacitor material. The same carbon material may be used in both the anode and cathode in an electric double-layer capacitor (EDLC).

Particles of one or more of the following polymers may be used as capacitor material in the cathode of the cell; poly (3-methyl thiophene), polyaniline, polypyrrole, poly(paraphenylene), polyacene, polythiophene, and polyacetylene.

The capacitor particles or lithium-ion battery anode particles or cathode particles are coated or otherwise suitably combined with a suitable amount of a bonding material. For example, the particles may be dispersed or slurried with a solution of a suitable resin, such as polyvinylidene difluoride dissolved in N-methyl-2-pyrrolidone, and spread and applied to a surface of a current collector in a porous layer. Other suitable binder resins include carboxymethyl cellulose/styrene butadiene rubber resins (CMC/SBR) or polytetrafluoroethylene (PTFE). The binders are not electrically conducive and should be used in a minimal suitable amount to obtain a durable coating of porous electrode material without fully covering the surfaces of the particles of electrode material.

In many battery constructions, the separator material is a porous layer of a polyolefin, such as polyethylene (PE), polypropylene (PP), non-woven, cellulose/acryl fibers, cellulose/polyester fibers, or glass fibers. Often the thermoplastic material comprises inter-bonded, randomly oriented fibers of PE or PP. The fiber surfaces of the separator may be coated with particles of alumina, or other insulator material, to enhance the electrical resistance of the separator, while retaining the porosity of the separator layer for infiltration with liquid electrolyte and transport of lithium ions between the cell electrodes. The separator layer is used to prevent direct electrical contact between the facing negative and positive electrode material layers and is shaped and sized to serve this function. In the assembly of the cell, the facing major faces of the electrode material/wire layers are pressed against the major area faces of the separator membrane. A liquid electrolyte is typically injected into the pores of the separator and electrode material layers.

In practices of this invention, metal foil current collectors are coated on one or both of their major surfaces with porous layers of individual electrode materials. The thicknesses of the coating layers are often varied for the purpose of managing the capacity of the layer to accept and release lithium ions and anions of the lithium electrolyte solution. In some embodiments of this invention, an electrode may be coated on both sides with capacitor particles or anode material particles or cathode material particles. The thicknesses of the coatings are not necessarily the same on each side of the current collector. Or one side of the current collector may remain uncoated with battery or capacitor particles. The thus prepared electrode materials may be used in combinations in the assembly of hybrid battery/capacitor cells. Following are illustrations of such combinations of hybrid electrodes in battery/capacitor material electrochemical material cells.

FIG. 1 illustrates the four cell units in side view for the purpose of showing the two relatively thin porous layers of electrode particles applied to both sides of a metallic current collector foil. The current collector foils are typically rectangular in shape with height and width dimensions suitable for assembly by stacking or winding into a unitary package of one or more electrochemical cells. If the finished electrochemical cell is to be formed of a stacking of two or more cell units (and their interposed separators) the current collector foils with their coatings of electrode materials may be nearly square. If the finished electrochemical cell is to be formed by winding of the cell units and separators, the foils may be quite long.

In FIG. 1A, a first cell unit 10 is formed of a cathode and an anode composed for a lithium-ion battery cell. The cell unit 10 includes a first current collector 11 coated on both sides with thin porous layers of particulate cathode material (e.g., NMC or LMO) 10' bonded to the major faces of the current collector 11. Current collector 11 may, for example, be formed of a rectangular aluminum foil with a suitable connector tab (+) on one side, the top side in FIG. 1A. In FIG. 1A a second current collector 11' (e.g., copper foil) is coated on both of its opposing sides with thin porous layers of particulate anode material 10" (e.g., graphite or LTO). Current collector 11' also has a suitable connector tab (−) on its top side. In this cell unit, the cathode is labeled with a plus (+) charge and the anode is labeled with a minus (−) charge as reflects their state in a charged cell, and as the cell is being discharged. Facing surfaces of an anode layer 10" and a cathode layer 10' are placed against a porous separator 18 of like size and shape. Porous separators 18 are typically formed of polymeric sheets. First cell unit 10 is also described as Unit A in the Summary section presented above in this specification.

In FIG. 1B, a second cell unit 12, structurally similar to the first cell unit 10, is formed of two electrodes, each containing porous layers of particles of capacitor material 12', 12". The electrodes may be formed of like materials but they will experience opposing charges (plus and minus) in the function of the electrodes. A first current collector foil (suitably an aluminum foil) 13 is coated on both of its opposing sides with a porous layer of, for example, activated carbon particles 12' to form a positive (+) capacitor electrode. A second current collector foil 13' (suitably a copper foil) is coated on both of its opposing sides with a porous layer of, for example, activated carbon particles 12" to form an electrode which is designated as (−) in FIG. 1B. The upstanding connector tabs of the respective current collectors (13, 13') are labeled with the respective positive (+) and negative (−) charges of the capacitor materials. Facing surfaces of the respective capacitor layers 12', 12" are placed against a porous separator 18 of like size and shape as the surfaces of the capacitor electrode material. Second cell unit 12 is also described as Unit B in the Summary section presented above in this specification.

In FIG. 1C, a third cell unit 14 is formed of a positive electrode of porous layers of cathode material (e.g., particles of LMO or NMC) 14' bonded to both sides of a current collector foil (e.g. an aluminum foil) 15. The third unit cell also includes a negative electrode formed of porous layers of particles of capacitor material 14" bonded to both sides of a copper current collector foil 15'. Again, the respective charges of the cathode material (+) and the capacitor material (−) are indicated on the upstanding connector tabs of their respective current collector foils (15, 15'). Facing surfaces of cathode material 14' and of capacitor material 14" are placed against opposite faces of a porous separator 18. Third cell unit 14 is also described as Unit C in the Summary section presented above in this specification The fourth cell unit 16 (FIG. 1D) is formed of a positive electrode of porous layers of capacitor particles 16' bonded to both sides of a current collector foil 17. The capacitor particles may be particles of activated carbon. The fourth cell unit in this embodiment of the invention also includes a negative electrode of porous layers of anode material 16" (e.g., graphite or LTO particles) bonded to both sides of a current collector foil 17'. The respective charges of the capacitor material (+) and the anode material (−) in the charged state of the cell unit are indicated on the upstanding connector tabs of their respective current collector foils (17, 17'). Facing surfaces of capacitor particles 16" and of anode material 16' are placed against opposite faces of a porous separator 18. Fourth cell unit 16 is also described as Unit D in the Summary section presented above in this specification The above described four cell units are used in combinations of at least two of the units (or more) and such that at least one capacitor electrode (positive or negative) is used in combination with battery anodes and cathodes. In each such combination of cell units, they will be assembled as stacks or wound rolls with interposed porous separator layers. And the pores of the electrode layers and separators will be infiltrated with a non-aqueous liquid electrolyte conductive of lithium cations and compatible anions. When desired, each of these new hybrid electrochemical cells may be combinations of two or more of the hybrid cells and the combined cells may be interconnected in parallel or series connection to obtain a hybrid mixture of lithium-ion battery and capacitor electrodes that provide a desired combination of energy and power characteristics.

The electrolyte for a subject hybrid lithium-ion battery/capacitor cell may be a lithium salt dissolved in one or more organic liquid solvents. Examples of suitable salts include lithium hexafluorophosphate ($LiPF_6$), lithium tetrafluoroborate ($LiBF_4$), lithium perchlorate ($LiClO_4$), lithium hexafluoroarsenate ($LiAsF_6$), and lithium trifluoroethanesulfonimide. Some examples of solvents that may be used to dissolve the electrolyte salt include ethylene carbonate, dimethyl carbonate, methylethyl carbonate, propylene carbonate. There are other lithium salts that may be used and other solvents. But a combination of lithium salt and solvent is selected for providing suitable mobility and transport of lithium ions in the operation of the hybrid cell with its battery and capacitor electrode combinations. The electrolyte is carefully dispersed into and between closely spaced layers of the electrode elements and separator layers.

In general, it is preferred to combine cell units to form a hybrid electrochemical cell producing an energy density in the range of 20 Wh/kg to 200 Wh/kg and a power density in the range of 500 W/kg and 10,000 W/kg. Values of energy density and power density depend on the composition of the battery electrode materials and of the capacitor electrode materials, and on the ratio of contents of battery electrode materials and capacitor electrode materials. In general energy density is improved by increasing battery material content and/or by selecting high specific energy battery electrode materials. And the power density of the hybrid electrochemical cell is increased by increasing the content of capacitor electrode material and/or by selecting high specific power density capacitor compositions. The use of combinations of the subject four-unit cell units is a convenient and effective method of preparing and using building units to produce one or more hybrid electrochemical cells having a desired combination of energy density and power density properties.

In FIG. 2A, a first hybrid electrochemical cell is illustrated. In this example, the hybrid electrochemical cell is formed by a combination of cell unit 10 (as described with respect to FIG. 1A) with cell unit 16 (as described with respect to FIG. 1D). This hybrid electrochemical cell (10, 16) comprises a positive electrode of cathode material 10' and a positive capacitor electrode 16' and two negative electrodes 10", 16" of anode material for a lithium-ion cell. An additional porous separator 18 is placed between the unit cell units 10, 16. The connector tabs of the positively charged capacitor material and the cathode material are to be interconnected in parallel combination. And the two connector tabs of negatively charged anode material are to be interconnected in parallel connection. The shapes of the respective layered electrodes will enable them to be assembled in stacks or wound rolls in forming the hybrid electrochemical cell (10, 16). In this example, the combination of the positively-charged capacitor electrode 16' with the positively charged cathode material 10', and the opposing two negatively-charged anode electrodes 10", 16", alters the power characteristics of the cell in favor of the negative electrodes. Thus, the compositions, thickness, and cross-sectional areas of the electrodes can be varied to provide predetermined energy and power density characteristics of this hybrid electrochemical cell (10, 16).

Figure 2B:
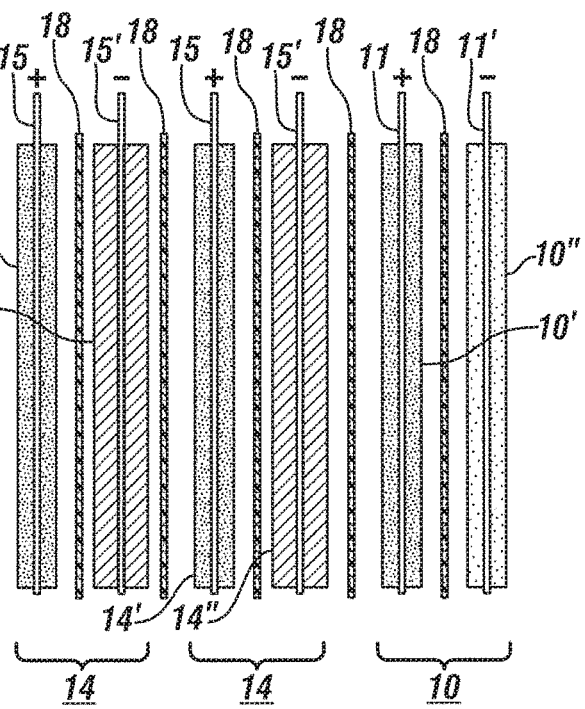

In FIG. 2B, a different hybrid electrochemical cell is illustrated. In this example, the hybrid electrochemical cell is formed by a combination of cell unit 10 with two cell units 14. The resulting assembly of cell units (14, 14, 10) produces a hybrid electrochemical cell comprising three connected positively charged cathode members 10', 14', 14' in combination with one negatively charged anode 10" and two negatively charged capacitor electrodes 14". Each group of three like-charged electrode members would be electrically connected in parallel in the operation of the hybrid cell.

It is noted that the capacitor material is used in a positive electrode in the example of FIG. 2A and in a negative electrode in the example of FIG. 2B. Assuming that each of the anode material, cathode material, and capacitor material are the same in the two hybrid cell examples, it is expected that the energy of the FIG. 2B cell will be higher than the energy of the FIG. 2A cell.

Figure 2C:
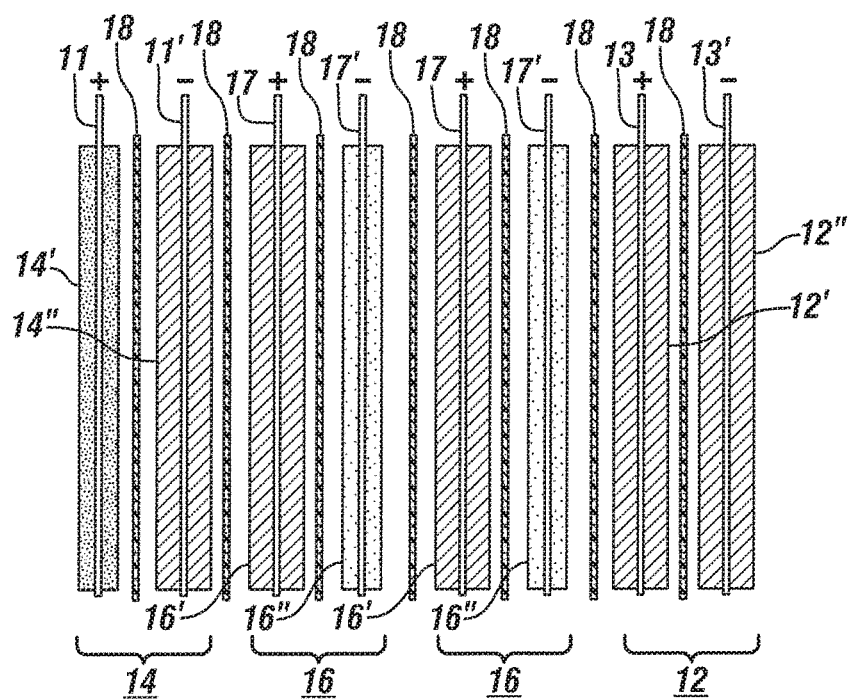

In FIG. 2C, the hybrid electrochemical cell comprises four unit cells—14, 16, 16, 12. As illustrated in FIG. 2C, this combination of unit cells produces a hybrid electrochemical cell formed of a single positively-charged cathode with three positively-charged capacitor electrodes in combination with two negatively charged anodes and two negatively charged capacitor electrodes. Each group of five like-charged electrode members would be electrically connected in parallel in the operation of the hybrid cell. Thus, this hybrid cell (14, 16, 16, 12) is provided with five capacitor electrodes and an unbalanced number (3) of lithium-ion battery electrodes. Such a combination of properly composed and sized electrodes can provide substantial power density properties in the resulting hybrid cell or combination of like hybrid cells.

Figure 3A:
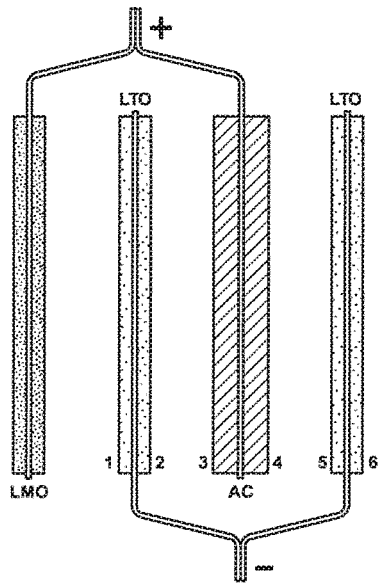
FIG. 3A is a schematic side-view of a modified version of the hybrid grouping of FIG. 2A.

FIG. 3A is a schematic side-view or edge-view of a modified version of the hybrid grouping of FIG. 2A. In FIG. 3A, two lithium titanate (LTO) anodes are paired with a lithium manganese oxide (LMO) battery cathode and an activated carbon (AC) capacitor cathode. The LTO anode members are electrically connected in parallel and indicated as negatively charged as they would be when the hybrid cell is being discharged. The LMO battery cathode and AC capacitor cathode are electrically connected in parallel and indicated as positively charged. Although not apparent from the side views, each of the electrodes is of like rectangular shape with their applied porous layers of electrode material covering most of the major surfaces of the respective current collectors except for the tabs on one side of the rectangular foil, used for electrical connection with other electrode members. The thicknesses of the current collector foils is typically in the range of about seven to twenty micrometers. The thicknesses of the respective applied electrode layers may be varied to provide the desired electrochemical capacity of the electrode material.

In this example, each of the electrodes is formed with a porous resin-bonded coating of the indicated electrode material on each side of a current collector foil. The two LTO anodes have particles of lithium titanate bonded as a porous layer of substantially uniform thickness on each side of a copper current collector foil. The LMO cathode has a porous layer of lithium manganese oxide particles bonded as a porous layer on each major surface of an aluminum current collector foil. And the capacitor (AC) is formed of a porous layer of substantially uniform thickness of activated carbon particles resin bonded to each side of an aluminum current collector foil. In this example, one LTO anode (to the left in FIG. 3A) has been stacked between the LMO cathode and the AC capacitor. The second LTO anode is stacked on the opposite side of the AC capacitor electrode. In this assembly of cell members, like-shaped, porous separator members (not illustrated to simplify the figure) would be placed between each of the surfaces of the electrode materials, and also on the outer face (as viewed in FIG. 3A) of the LMO cathode and the outer face of the outer LTO anode. The porous electrode material layers and the porous separators would be stacked closely together and suitably infiltrated with a non-aqueous liquid electrolyte solution of a lithium electrolyte composition, such as $LiPF_6$.

Under the influence of a cell-charging, direct current (during which the LTO anodes are positively charged) is passed through the hybrid cell of FIG. 3A. Lithium ions are released from the LMO cathode and the AC capacitor and driven under the charging potential through the liquid electrolyte into the lithium titanate particles. Lithium ions from the LMO electrode are transported most directly into side 1 of the LTO anode assembled on the left side of the FIG. 3A hybrid cell. Lithium ions are also transported from side 3 of the enhanced-size AC capacitor (which is negatively charged during cell charging) to side 2 of the LTO anode. Further, lithium ions are desorbed from side 4 of the AC capacitor to sides 5 and 6 of the LTO anode assembled on the right side of the hybrid cell of FIG. 3A. When the lithium titanate content on both sides of an LTO anode are about the same, it is preferred that each side of anode material receive the same appropriate, balanced amount of lithium ions.

The lithium titanate composition is chemically capable of receiving lithium ions during charging and incorporating the lithium in the lithium titanate composition of the anode material. As may be obtained from LTO material data, or determined experimentally, the total weight (or molar content) of lithium titanate particles in each LTO anode is capable of receiving (intercalating) a known quantity of lithium during a charging cycle. And the applied charging potential and duration is managed such that the anode material can assimilate the lithium ions into the micrometer size LTO particles without an imbalance of lithium being accumulated on or around the LTO particles. In general, a known amount of lithium can be received from the combination of the LMO cathode particles and AC capacitor particles.

It is to be recognized that during discharge of the hybrid cell, lithium ions are released from both sides of the LTO electrodes (of FIG. 3A). Some of the lithium ions are transported back through the electrolyte and intercalated into the LMO cathode particles. The balance of the lithium ions, released during cell discharge, are intended to associate with anions ($PF_6^-$) released by the AC capacitor particles. In the operation of this cell, the AC capacitor particles absorb $PF_6^-$ anions during charging of the hybrid cell and release the anions during discharge of the cell. The amount of AC capacitor particles must be managed for it adsorb and release a sufficient number of anions to enable the LTO electrodes and the LMO electrode to accept and release their intended amounts of lithium ions. In the schematic illustration of FIG. 3A, the amount of capacitor material has been increased to serve its required anion absorbing and desorbing function.

As stated above in this specification, the capacitor particles typically accept less anions per unit weight or molar unit than the amount of lithium ions accepted by particles of battery material. In order to avoid imbalances of lithium ions throughout the materials of the hybrid cell, it is preferred, and often necessary, to provide a suitable, predetermined balance in battery electrode material particles and capacitor material particles. This balance enables the hybrid cell to display columbic efficiency and maintain its capacity and functional life. In this practice of the operation of the hybrid electrochemical cells of this disclosure, it is necessary to seek and find a suitable balance between the capacities of each battery electrode and a capacitor electrode between which lithium ions are exchanged during cycling of the hybrid cell. This typically involved balance the weights or molar amounts of such lithium ion exchanging battery and capacitor materials.

In the hybrid cell configuration of FIG. 3A, it is intended that lithium ions will be transported through the liquid electrolyte solution so as to reach each deposited layer of the opposing bodies of electrode materials. Lithium ions released by amount of active anode material in the two LTO anodes must be effectively accepted into the LMO cathode and the AC cathode. Accordingly, the respective amounts of electrode materials must be suitably balanced to achieve this result. In this example, the amount of anode and cathode battery materials are pre-determined and the amount of AC capacitor particles are then determined in view of the set lithium ion accepting capacities of the LTO and LMO materials. Thus, the relative thicknesses (reflecting weights or molar amounts) of the LMO electrode and two LTO electrodes are indicated schematically in FIG. 3A. In general, this requires an amount of activated carbon particles leading to thicker layers (labeled 3,4) of capacitor material on the AC cathode member in FIG. 3A, as compared with the thicknesses (also reflecting weight or molar amounts) of the lithium titanate particles (labelled 1,2 on the centered LTO electrode). In this hybrid cell arrangement, it is preferred that the capacity (C) of side 2 of the LTO electrode to accept lithium ions be equivalent to 0.8-1.2 C of the of side 3 of the AC cathode. The same proportioning of capacities would also apply to the activated carbon content of side 4 of the AC capacitor electrode with the facing side 5 of the LTO electrode to its right in FIG. 3A.

Figure 3B:
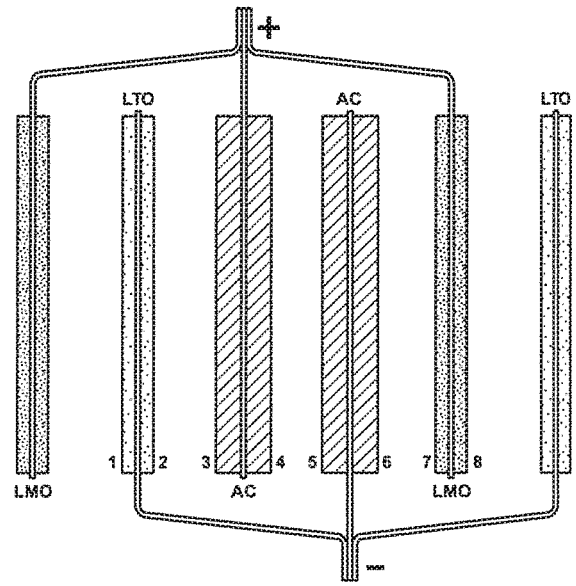
FIG. 3B is a schematic side-view of a modified version of the hybrid grouping of FIG. 2B.

FIG. 3B is a modified and simplified side-view or edge-view of the hybrid cell grouping of FIG. 2B. In the hybrid cell arrangement of FIG. 3B, a LTO anode, an AC capacitor, and a second LTO anode are electrically connected in parallel arrangement, indicated as negatively charged. Inserted between them are an LMO cathode, an AC capacitor, and a second LMO cathode, connected in parallel and indicated as positively charged. As illustrated in FIG. 3B, side 2 of one of the LTO anodes is facing side 3 of an oppositely charge AC capacitor. And side 7 of an LMO cathode is facing side 6 of a different AC capacitor. The lithium-accepting capacities of the LTO anodes and the LMO cathodes are predetermined and are substantially equivalent. However, the relative amounts of the oppositely-charged AC capacitor members were increased such that the activated carbon capacitor materials had sufficient capacity to receive lithium cations and the corresponding anions (e.g., $PF_6^-$) in the repeated charging and discharging of the hybrid cell. In this example, the relative capacities (C) of the electrode materials (with reference to the numbered electrode layers in FIG. 3B) are as follows: $C_{LMO-7}=C_{AC-6}$ and $C_{LTO-2}/C_{AC-3}=0.8-1.2$.

Figure 4A:
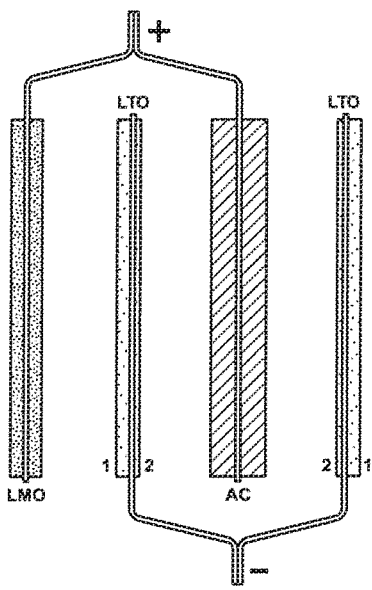
FIG. 4A is a simplified schematic side-view of a second modified version of the hybrid grouping of FIG. 2A.
Figure 4B:
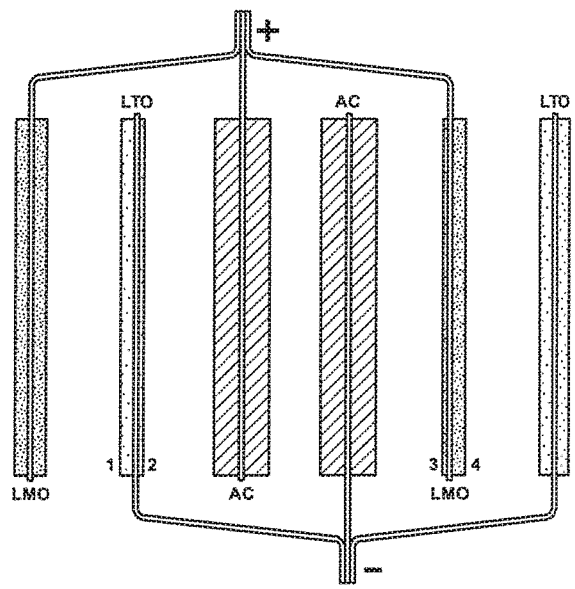
FIG. 4B is a simplified schematic side-view of a second modified version of the hybrid grouping of FIG. 2B.

The hybrid cell arrangements in FIGS. 4A and 4B are like those respectively in FIGS. 3A and 3B, but lithium ion accepting capacities of the battery materials and the capacitor materials have been balanced in a different manner. In these examples, the amount of battery electrode material is reduced on one side of a LTO anode or a LMO cathode in order balance the lithium ion assimilating capacity of a pre-set AC capacitor.

In FIG. 4A, two LTO anodes, connected in parallel and indicated with a negative charge, are interposed with an LMO cathode and an enlarged AC capacitor, connected in parallel and indicated with a positive charge. In this example, the current capacity of the AC capacitor electrode is about 30% of the capacities of the facing sides of the LTO electrodes. Again, in FIG. 4A, the LTO anodes are positioned on opposite sides of the enlarged AC capacitor. In FIG. 4A, the sides of the LTO electrodes, labelled LTO-2, are facing opposite sides of the two-side coated AC capacitor. The opposite sides of the LTO electrodes are labelled LTO-1. In this example, the loadings of lithium titanate particles are reduced on the LTO-2 sides of the anodes in order to balance the lithium assimilating capacity of the hybrid cell, including the AC capacitor. The loadings of lithium titanate particles on the current collectors were asymmetric. The loading ratios of the lithium titanate particles on the sides of the LTO electrodes are respectively, LTO-2/LTO-1=0.2-0.5.

In the hybrid cell arrangement of FIG. 4B, a LTO anode, an AC capacitor, and a second LTO anode are electrically connected in parallel arrangement, indicated as negatively charged. Inserted between them are an LMO anode, an AC capacitor, and a second LMO, connected in parallel and indicated as positively charged. In this hybrid cell arrangement of FIG. 4B, the positively charged AC capacitor and the negatively-charged AC capacitor are placed next to each other. The positively charged AC also faces an LTO anode (with sides labelled 1,2 in FIG. 4B) and the negatively charged AC also faces a positively charged LMO cathode (with sides labelled 3,4). In this example, the loading of lithium titanate particles on side LTO-2 are reduced and the loading of lithium manganese oxide particles on side LMO-3 are reduced to balance the capacities of the respective electrodes of the hybrid cell to assimilate lithium ions.

The loading ratios of the lithium manganese oxide particles on the sides of the LMO electrodes are LMO-3/LMO-4=0.2-0.5. And the loading ratios of the lithium titanate particles on the sides of the LTO electrodes are respectively, LTO-2/LTO-1=0.2-0.5.

Figure 5A:
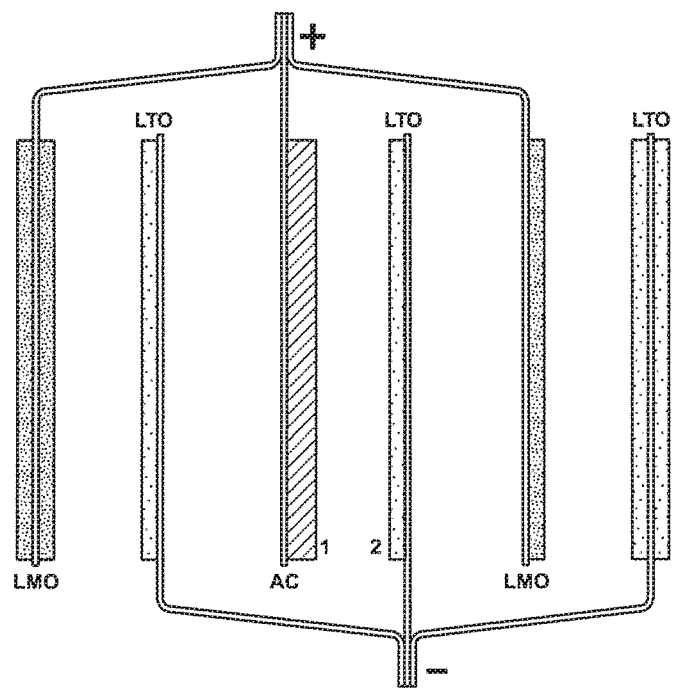
FIG. 5A is a simplified schematic side-view of another modified version of a six-member grouping of battery and capacitor electrodes in a hybrid cell arrangement.
Figure 5B:
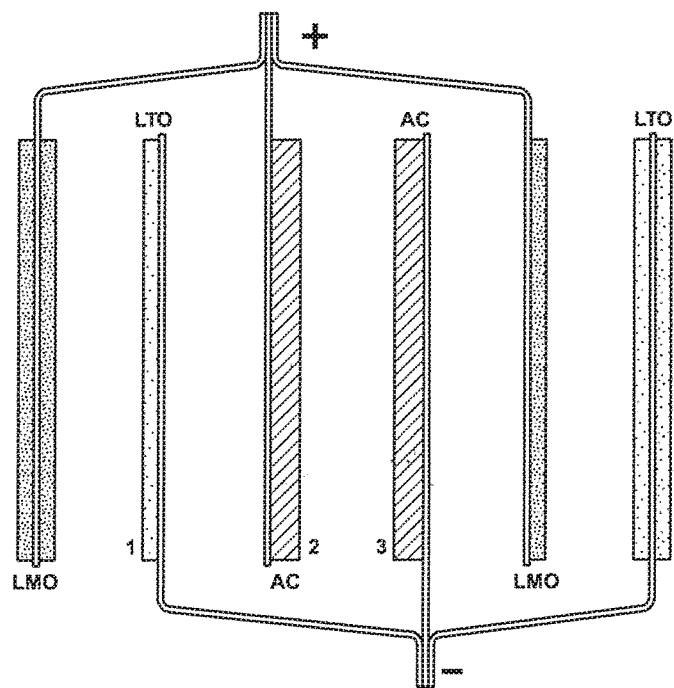
FIG. 5B is a simplified schematic side-view of another modified version of a six-member grouping of battery and capacitor electrodes in a hybrid cell arrangement.

FIGS. 5A and 5B illustrate the use of a single sided battery electrode with an optimized capacity ratio (for absorbing lithium ions) between a lithium ion battery electrode and a capacitor electrode.

FIG. 5A illustrates a hybrid cell formed of three LTO anode members, electrically connected in parallel, and indicated as negatively charged. The anode members are interposed with two LMO cathode members and a central AC capacitor member. As illustrated, the AC capacitor is placed between two of the three LTO anodes. In order to balance the lithium ion absorbing capacities of the respective members of the hybrid cell, the AC capacitor is formed with a coating on only one side of its current collector and the LTO anodes on the sides of the AC capacitor are also single side-coated. Further, a one side-coated LMO cathode is positioned facing a one side-coated LTO anode. As illustrated in FIG. 5A, the uncoated side of the AC capacitor faces an uncoated side of a one side-coated LTO anode. And the coated side of the AC capacitor (labelled 1) faces the coated side (labelled 2) of the one side-coated LTO cathode. The only two side coated electrodes in this hybrid cell embodiment are the outer placed LMO cathode and LTO anode.

In order to balance the lithium ion absorbing capacities (C) of the electrodes of the hybrid cell, it is preferred that $C_{LTO-2}/C_{AC-1}=0.8-1.2$. This balance of capacities between facing coated sides of the specified LTO electrode and the only capacitor electrode serves to avoid unwanted rebalance reactions of lithium ions at the respective electrodes. In this arrangement of anode electrodes facing a capacitor electrode, the specified N/P ratio serves to balance the movement of lithium ions in this hybrid cell arrangement.

FIG. 5B illustrates a hybrid cell formed of an assembly of two outer LTO anode members (one of which is one side coated with lithium titanate particles) with a one side-coated AC capacitor member between them. They are electrically connected in parallel and indicated as negatively charged. The interposed cathode members consist of two outer LMO cathodes (one of which is one side-coated) with a one side-coated AC capacitor between them. As illustrated the negatively-charged and positively-charged one side-coated AC capacitors (respectively labelled 2 and 3) are placed side by side (with an intervening separator, not illustrated) with a one side-coated LTO anode (labelled 1) and a one side-coated LMO cathode opposite their outer uncoated surfaces. The active carbon particle coated surfaces of the AC cathodes (labelled 2 and 3) face toward each other (through a separator, not illustrated) in the assembled cell.

In order to balance the lithium ion absorbing capacities (C) of the electrodes of the hybrid cell, it is preferred that $C_{AC-2}=C_{AC-3}$ and $C_{LTO-1}/C_{AC-2}=0.8$-$1.2$. Again, this balance of capacities between of the battery electrodes and the capacitor serves to avoid unwanted rebalance reactions of lithium ions at the respective electrodes. In this arrangement of anode electrodes facing a capacitor electrode, the specified N/P ratio serves to balance the movement of lithium ions in this hybrid cell arrangement.

The above specific examples are intended to illustrate practices of the invention, but these illustrations are not limitations on the scope of the invention. It is clear that the above described basic hybrid electrodes and hybrid combinations of electrodes may be readily prepared and combined to make widely different useful hybrid electrochemical cells with different combinations and balances of battery and capacitor properties.

The invention claimed is:

1. An electrochemical cell comprising an assembly of at least two pairs of stacked or wound rolls of facing electrodes of opposed electrical charge, each electrode consisting of a two-sided current collector foil coated on one or both sides with a porous layer of particles of an electrode material, each coated layer of electrode material being one selected from the group consisting of (i) a lithium ion intercalating/de-intercalating anode material, (ii) a lithium ion intercalating/de-intercalating cathode material, and (iii) a lithium ion, or compatible electrolyte anion, adsorbing/desorbing capacitor material, the porous layers of each electrode material being separated from each other by the two-sided current collector foil and from a directly facing layer of an electrode by a co-extensive porous separator layer, the porous layers of each electrode material and each separator being infiltrated with a non-aqueous liquid electrolyte of lithium ions and compatible anions;

the at least two pairs of stacked or wound rolls of facing electrodes of opposite charge comprising an outer coated layer of electrode material at each end of the stack or wound roll with each of the other coated layers of electrode material being internal with respect to the outer coated layers of electrode material;

the porous layers of electrode material that are coated separately on each two-sided current collector foil being selected from the group consisting of: (i) a layer of lithium-ion anode material on one or both sides of the current collector foil, (ii) a layer of lithium-ion cathode material on one or both sides of the current collector foil, and (iii) a layer of capacitor material on one or both sides of the current collector foil;

the assembly of at least two pairs of facing, opposing electrical charge electrodes including at least one electrode coating layer of capacitor material facing at least one layer of opposing lithium-ion anode material or at least one layer of opposing lithium-ion cathode material, the measured lithium ion-adsorbing or anion-adsorbing capacity of the capacitor material and the measured lithium ion accepting capacity of the anode or cathode material being in the ratio range of 0.8-1.2;

the at least two pairs of stacked or wound rolls of facing electrodes of opposite charge comprising a majority of the electrode coating layers of capacitor material which are located internally with respect to the outer layers of coated electrode materials; and the layers of electrode material on the at least two pairs of opposing electrodes being selected to obtain a predetermined combination of energy density (Wh/kg) and power density (W/kg) for the electrochemical cell.

2. An electrochemical cell as stated in claim 1 in which the anode material is lithium titanate, the cathode material is lithium manganese oxide, and the capacitor material is activated carbon.

3. An electrochemical cell as stated in claim 1 in which the electrochemical cell comprises two to four positive-charge electrode members interposed with a like number of negative-charge electrode members, at least one of the electrode members being a particulate capacitor composition directly facing a battery electrode composition of the opposite charge, the measured lithium ion accepting capacity of the capacitor material and the measured lithium ion accepting capacity of the battery composition material being in the ratio range of 0.8-1.2.

4. An electrochemical cell as stated in claim 3 in which the anode material is lithium titanate, the cathode material is lithium manganese oxide, and the capacitor material is activated carbon.

5. An electrochemical cell as stated in claim 1 in which the electrochemical cell comprises two to four positive-charge electrode members interposed with a like number of negative-charge electrode members, at least one of the electrode members being a particulate capacitor composition directly facing an anode composition of the opposite charge, the measured lithium ion accepting capacity of the capacitor material and the measured lithium ion accepting capacity of the anode composition material being in the ratio range of 0.8-1.2.

6. An electrochemical cell as stated in claim 5 in which the capacitor material is activated carbon and the anode material is lithium titanate.

7. An electrochemical cell as stated in claim 1 in which the electrochemical cell comprises three positive charge electrode members and three negative charge electrode members, a positive charged capacitor electrode directly facing a negative charged capacitor electrode, an anode electrode directly facing the positive charge capacitor electrode, and a cathode electrode directly facing the negative charge capacitor electrode, and the capacitor electrodes having equal ion absorbing capacity.

8. An electrochemical cell as stated in claim 7 in which the capacitor material is activated carbon, the anode material is lithium titanate, and the cathode material is lithium manganese oxide.

9. An electrochemical cell as stated in claim 1 comprising two negative charge anodes with a positive charge capacitor electrode placed between them and a cathode placed directly facing one of the anodes, the thickness of the anode material on the side of each anode facing the capacitor electrode being less than the thickness of the anode material on the opposite sides of their respective current collectors.

10. An electrochemical cell as stated in claim 9 in which the capacitor material is activated carbon, the anode material is lithium titanate, and the cathode material is lithium manganese oxide.

11. An electrochemical cell as stated in claim 1 in which the electrochemical cell comprises three positive charge electrode members and three negative charge electrode members in which a positive charged capacitor electrode is directly facing a negative charged capacitor electrode, an anode electrode is directly facing the positive charge capacitor electrode, and a cathode electrode is directly facing the negative charge capacitor electrode, the capacitor electrodes having equal ion absorbing capacity, the thickness of the anode material on the side of the anode electrode directly facing the positive charge capacitor electrode being less than the thickness of the anode material on the other side of its anode current collector, and the thickness of the cathode material on the side of the cathode directly facing the negative charge capacitor being less than the thickness of the cathode material on the other side of its cathode current collector.

12. An electrochemical cell as stated in claim 11 in which the capacitor material is activated carbon, the anode material is lithium titanate, and the cathode material is lithium manganese oxide.

13. An electrochemical cell as stated in claim 1 in which the electrochemical cell comprises three negative charge anodes, two of the anodes being one side-coated, and two positive charge cathodes, one of which is one side-coated, and a positive charge one side-coated capacitor, the cell being assembled with an uncoated side of an anode directly facing an uncoated side of the capacitor, the coated side of the second anode directly facing the coated side of the capacitor, and the uncoated side of the cathode directly facing the uncoated side of the second anode.

14. An electrochemical cell as stated in claim 13 in which the capacitor material is activated carbon, the anode material is lithium titanate, and the cathode material is lithium manganese oxide.

15. An electrochemical cell as stated in claim 1 in which the electrochemical cell comprises two anode members and a negatively charged capacitor member alternately interposed with two cathode members and a positively charged capacitor member, the oppositely-charged capacitor members being adjacent electrode members with an anode member adjacent to the positively charged capacitor and a cathode member adjacent to the negatively charged capacitor member; the capacitor members, one anode member, and one cathode member each being coated with a porous layer of active electrode particles on only one side of the current collector for the electrode, the coated side of each capacitor directly facing each other, the uncoated side of the one anode member directly facing the uncoated side of the positively charged capacitor and the uncoated side of the one cathode member directly facing the negatively charged capacitor.

16. An electrochemical cell as stated in claim 15 in which the capacitor material is activated carbon, the anode material is lithium titanate, and the cathode material is lithium manganese oxide.

17. A lithium-ion electrochemical cell comprising an assembly of at least two pairs of stacked or wound rolls of facing electrodes of opposed electrical charge, each electrode consisting of a two-sided current collector foil coated on one or both sides with a porous layer of particles of an electrode material selected from the group consisting of (i) a lithium ion intercalating/de-intercalating anode material, (ii) a lithium ion intercalating/de-intercalating cathode material, and (iii) a lithium ion, or compatible electrolyte anion, adsorbing/desorbing capacitor material, the porous layers of each electrode material being separated from each other by the two-sided current collector foil and from a facing layer of an electrode by a co-extensive porous separator layer, the porous layers of each electrode material and each separator being infiltrated with a non-aqueous liquid electrolyte of lithium ions and compatible anions; the electrochemical cell being further characterized by the at least two pairs of stacked or wound rolls of facing electrodes of opposite charge comprising an outer coated layer of electrode material at each end of the stack or wound roll with each of the other coated layers being internal with respect to the outer coated layers;

an internal anode material electrode directly facing an internal capacitor material electrode of the opposite electrical charge, the measured lithium ion accepting capacity of the anode material electrode and the measured anion adsorbing capacity of the capacitor material being in the ratio range of 0.8-1.2.

18. An electrochemical cell as stated in claim 17 in which the anode material is lithium titanate and the capacitor material is activated carbon.

19. A lithium-ion electrochemical cell comprising an assembly of at least two pairs of stacked or wound rolls of facing electrodes of opposed electrical charge, each electrode consisting of a two-sided current collector foil coated on one or both sides with a porous layer of particles of an electrode material selected from the group consisting of (i) a lithium ion intercalating/de-intercalating anode material, (ii) a lithium ion intercalating/de-intercalating cathode material, and (iii) a lithium ion, or compatible electrolyte anion, adsorbing/desorbing capacitor material, the porous layers of each electrode material being separated from each other by the two-sided current collector foil and from a facing layer of an electrode by a co-extensive porous separator layer, the porous layers of each electrode material and each separator being infiltrated with a non-aqueous liquid electrolyte of lithium ions and compatible anions; the electrochemical cell being further characterized by the at least two pairs of stacked or wound rolls of facing electrodes of opposite charge comprising an outer coated layer of electrode material at each end of the stack or wound roll with each of the other coated layers being internal with respect to the outer coated layers;

an internal cathode material electrode directly facing an internal capacitor material electrode of the opposite electrical charge, the measured lithium ion accepting capacity of the cathode and the measured ion adsorbing capacity of the capacitor material electrode being in the ratio range of 0.8-1.2.

20. An electrochemical cell as stated in claim 19 in which the cathode material is lithium manganese oxide and the capacitor material is activated carbon.

* * * * *